United States Patent
Dai et al.

(10) Patent No.: US 11,073,459 B2
(45) Date of Patent: Jul. 27, 2021

(54) METHOD FOR EVALUATING AN PRETREATMENT EFFECT FOR ORGANIC SOLID WASTE BASED ON FRACTAL DIMENSION

(71) Applicant: TONGJI UNIVERSITY, Shanghai (CN)

(72) Inventors: Xiaohu Dai, Shanghai (CN); Yu Hua, Shanghai (CN); Chen Cai, Shanghai (CN); Shuxian Chen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/110,440

(22) Filed: Dec. 3, 2020

(65) Prior Publication Data

US 2021/0172849 A1    Jun. 10, 2021

(30) Foreign Application Priority Data

Dec. 4, 2019   (CN) .......................... 201911228358.9

(51) Int. Cl.
*G01N 15/02* (2006.01)
(52) U.S. Cl.
CPC ..... *G01N 15/0205* (2013.01); *G01N 15/0211* (2013.01)
(58) Field of Classification Search
IPC ....................... G01N 15/0211, 15/0205, 15/0088
See application file for complete search history.

(56) References Cited

U.S. PATENT DOCUMENTS

2018/0132506 A1   5/2018 Meiron et al.

FOREIGN PATENT DOCUMENTS

| CN | 101968831 A | 2/2011 |
| CN | 105445141 A | 3/2016 |
| CN | 108830429 A | 11/2018 |
| CN | 109321606 A | 2/2019 |

OTHER PUBLICATIONS

K. László, A. Bóta, L.G. Nagy, G. Subklew, M.J. Schwuger, Fractal approach of activated carbons from solid waste materials, Colloids and Surfaces A: Physicochemical and Engineering Aspects, vol. 138, Issue 1, 2018.*

(Continued)

*Primary Examiner* — Rebecca C Bryant

(57) ABSTRACT

Provided is a method for evaluating a pretreatment effect for organic solid waste based on fractal dimension, relating to biological conversion of organic solid waste. Samples of the organic solid waste are collected, and dried and broken up to obtain dried samples. The mixtures obtained are analyzed using a laser particle size analyzer, so as to measure a wave vector Q and a scattering intensity I of each of the mixtures. According to a fractal theory, the wave vector Q and the scattering intensity I obtained are analyzed using a data processing software to obtain a two-dimensional fractal dimension $D_f$ of each of the samples. Based on data from documents and experiments, a total organic carbon or an apparent activated energy is evaluated, so as to evaluate the pretreatment effects of samples of the organic solid waste.

7 Claims, 1 Drawing Sheet

(56) References Cited

OTHER PUBLICATIONS

Luo YX, Liu RT, Zhang J, Chang HT. [Soil particle composition, fractal dimension and their effects on soil properties following sand-binding revegetation within straw checkerboard in Tengger Desert, China]. Ying Yong Sheng Tai Xue Bao. Feb. 2019;30(2) 525-535. doi:10.13287/j.1001-9332.201902.025. PMID: 30915805.*

Li, K., Yang, H., Han, X. et al. Fractal features of soil particle size distributions and their potential as an indicator of Robinia pseudoacacia invasion1. Sci Rep 8, 7075 (2018). https://doi.org/10.1038/s41598-018-25543-0.*

Ye Xiefeng, Yu Xiaona, Zhou Hanjun, Li Zhipeng, Zhang Xiaofan; Pore Structure and Fractal Characteristics of Biochars From Different Straw; Mar. 31, 2019; Key Laboratory for Tobacco Cultivation of Tobacco Industry, Zhengzhou, China.

Liu Qingyu, Zhai Jianyu, Liu Bolin, Zhang Min, Yang Ming, Lin Tianchi, Guan Qi, Xue Zhiping; Effect of Coupling of Corn Straw and Domestic Sewage on Anaerobic Fermentation; Dec. 31, 2018; College of Engineering, Shenyang Agricultural University Shenyang, China;Institute of Information and Narigation, The People's Republic of China Air Force Engineering University, Xi'an, China.

\* cited by examiner

METHOD FOR EVALUATING AN PRETREATMENT EFFECT FOR ORGANIC SOLID WASTE BASED ON FRACTAL DIMENSION

CROSS-REFERENCE TO RELATED APPLICATIONS

This application claims the benefit of priority from Chinese Patent Application No. 201911228358.9, filed on Dec. 4, 2019. The content of the aforementioned application, including any intervening amendments thereto, is incorporated herein by reference in its entirety.

TECHNICAL FIELD

The present application relates to biological conversion of organic solid waste, and more particularly to a method for evaluating a pretreatment effect for organic solid waste based on fractal dimension.

BACKGROUND

At present, there is a large amount of organic solid waste produced from corps per year, and the organic solid waste is mainly used as fertilizers, feeds, base materials, fuels, and raw materials to realize comprehensive utilization thereof. For example, since organic waste straws are various carbon-based organic macromolecular functional bodies in terms of composition, they can be used as a biomass to develop functional products, such as, green and recyclable biofuels. Structurally, the straws include substances, such as hemicelluloses, lignin and pectin, which wrap cellulose components tightly to form a dense porous structure. Therefore, a natural anti-degradation barrier is formed in the straw, and physical properties of lignocellulosic solid substrates cause particle effects, such as adsorption and desorption, water restraint and substrate inhibition, which leads to a poor economy effect in the conversion and utilization process of the straws and few high-value utilization channels. Therefore, a large number of straws are returned to the field or disorderly burned to cause plant diseases and insect pests and air pollution. On the other hand, there is a petroleum shortage and a natural gas shortage, and the straws can be used as raw materials to prepare oils and biogas, thereby reducing import pressure of oil and gas resources.

Anaerobic digestion is a series of biological processes in which organic solid waste is broken down through microbial fermentation to produce biogases, and the digested effluent and digested sludge are reused in farmland. The biogas industry has drawn worldwide attentions, for example, there are more than 10000 straw biogas projects in Germany. However, current technologies in biogas projects are limited due to the wide temporal and spatial distribution of raw materials and the variety thereof. In addition, the organic solid waste, such as a straw, usually has a natural anti-degradation barrier and a solid lignocellulose substrate, which leads to a low gas production efficiency and a long fermentation cycle. Thus, a pretreatment that effectively breaks the barrier and improves a bioavailability of the organic solid waste is significant for the biogas projects.

There is no exact standard for evaluating the bioavailability of anaerobic digestion for the organic solid waste collected in different areas, the organic solid waste of different kinds, the organic solid waste collected at different times or the organic solid waste pretreated by different treatment methods. The common evaluation is an empirical standard that is based on color changes, pretreatment time and environmental conditions, or a time-consuming experiment for measuring an anaerobic biotransformation potential for 30-60 days in the laboratory with professional instruments. Therefore, it is urgent to provide an effective and scientific method for evaluating a pretreatment effect for the organic solid waste.

SUMMARY

In order to solve the problems in the prior art, the present disclosure aims to provide a method for evaluating a pretreatment effect for organic solid waste based on fractal dimension. A total organic carbon ($TOC_{max}$) and an apparent activated energy (AAE) of organic solid waste can be simultaneously evaluated through an index after the pretreatment for the organic solid waste.

Technical solutions of the present disclosure are described as follows.

Provided is a method for evaluating a pretreatment effect for organic solid waste based on fractal dimension, comprising:
1) collecting samples of the organic solid waste, and drying and breaking up the samples to obtain dried samples;
2) adding water into the dried samples obtained in step (1) followed by stirring to obtain mixtures, respectively;
3) analyzing the mixtures obtained in step (2) using a laser particle size analyzer, so as to measure a wave vector Q and a scattering intensity I of each of the mixtures;
4) according to a fractal theory, analyzing the wave vector Q and the scattering intensity I obtained in step (3) using a data processing software; and obtaining a two-dimensional fractal dimension $D_f$ of each of the samples according to a formula $I \propto Q^{-D_f}$;
5) constructing a calculation model of the $D_f$ and a $TOC_{max}$ or an AAE using linear regression; and
6) plugging the $D_f$ of each of the samples into the calculation model obtained in step (5) to obtain the $TOC_{max}$ or the AAE of each of the samples, so as to evaluate the pretreatment effects for samples of the organic solid waste.

In some embodiments, in step 1, the samples are samples which are pretreated.

In some embodiments, in step 1, the samples are samples with different sizes or samples pretreated by different methods.

In some embodiments, the samples are broken up as particles having a size ranging from 0.01 to 3500 microns.

In some embodiments, in step 2, each of the dried samples is diluted with pure water in a container to obtain a mixture with a solid content of less than 5%; the mixture is stirred by an external magnetic stirrer having a magnetic stirring bar; and the container and the magnetic stirring bar are cleaned and dried before use.

In some embodiments, in step (3), a light source of the laser particle size analyzer is a helium-neon laser emitting at 633 nm; a refractive index of a dispersant is 1.330; an absorption rate of particles in the dispersant is 0.100; a density of the dispersant is greater than 1; the dispersant is water; time for a background measurement is 10 s; time for measuring the mixture is 10-12 s; time for measuring the mixture with uneven dispersion is 10-20 s; the mixture is measured 3 times; during a measurement, a shading range of the mixture containing particles having a diameter of tens of microns is 10-20%; a shading range of the mixture containing particles having a diameter of a few microns is 6-10%; a shading range of the mixture containing particles have a diameter of hundreds of nanometers is 4-6%; a stirring speed is 2000-3000 r/min; and after the mixture is measured, a cleaning system of the laser particle size analyzer is operated.

In some embodiments, in step (4), the formula $I \propto Q^{-D_f}$ is an equation $I = k \cdot Q^{-D_f}$, wherein k is a slope; both sides of the equation take natural logarithm to obtain: $\ln I = \ln(k \cdot Q^{-D_f})$; then the equation is simplified as: $\ln I = -D_f \ln Q + \ln k$; the I and the Q obtained in step (3) take the natural logarithm to obtain ln I and ln Q which are taken as a dependent variable and an independent variable of the equation, respectively, and the ln I and the ln Q are inputted into the data processing software to determine the $D_f$ of each of the samples using stochastic gradient descent.

In some embodiments, in step 5, the calculation model of the $D_f$ and the $TOC_{max}$ or the AAE of each of the samples is:

$$Y = A - BX;$$

wherein X is the fractal dimension $D_f$, Y is the $TOC_{max}$ or the AAE of each of the samples; A and B are coefficients of the calculation model of the $TOC_{max}$ or AAE.

In some embodiments, in step 6, the $TOC_{max}$ is a maximum dissolution value of total organic carbon of each of the samples in an aqueous phase.

The present invention has the following beneficial effects.

1) The method of the present invention is simple to operate, and measurement values can be obtained by using a data processing software and a laser particle size analyzer, which is time- and energy-saving.

2) Compared to the prior art, the method provided herein is more effective. Parameters used in this method are not results indicators such as cumulative concentrations of volatile fatty acids and biochemical methane potentials, but properties of source materials for biological conversion. Properties of the organic solid waste are significant for biological anaerobic conversion. The method of the present invention evaluates the bioavailability of organic solid waste by an anaerobic conversion based on fractal dimension.

BRIEF DESCRIPTION OF THE DRAWINGS

Advantages and features of the present disclosure will be obvious from the following description in conjunction with the embodiments. It is apparent that the drawings in the following description are only some embodiments of the present disclosure. For those of ordinary skill in the art, other drawings can be obtained without creative efforts.

DETAILED DESCRIPTION OF EMBODIMENTS

Figure 1:
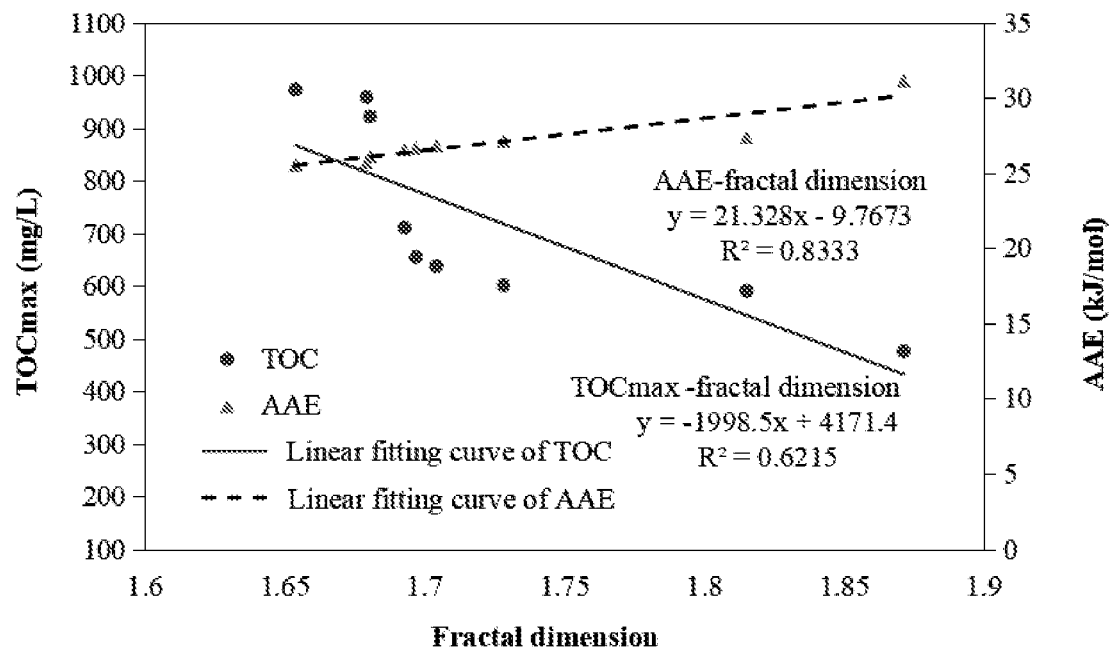
FIG. 1 shows fitting curves for evaluating pretreatment effects for rice straws with different sizes based on fractal dimension according to an embodiment of the present disclosure.

The exemplary embodiments of the present application are described in detail below, which are only illustrative and are not intended to limit the scope of the application.

It should be understood that the terms of the application are only used to describe specific embodiments, and are not intended to limit the scope of the application. In addition, the numerical range of the application also specifically should be understood as including each intermediate value between the upper limit and the lower limit of the range. Each smaller range between any stated value and any other stated values or between an intermediate value and any other intermediates value within the stated range is also included in the present application. The upper and lower limits of these smaller ranges can be independently included or excluded from the range.

Unless otherwise mentioned, all technologies and scientific terms used herein have the same meanings as that understood by those of ordinary skill in the art. Based on the preferred methods and materials of the present application, any similar or equivalent methods and materials can also be used in the practice or testing of the present application. All documents mentioned in the description are incorporated by reference to disclose and describe methods and/or materials related to the documents.

In case of conflict with any incorporated document, the contents of this description shall prevail.

It is obvious for those skilled in the art to make any improvement and change within the spirit and principle of this application and other embodiments based on the description of the present application. The description and embodiments of the application are only exemplary.

Embodiment 1

A method for evaluating a pretreatment effect for organic solid waste based on fractal dimension includes the following steps.

1) A sample of the organic solid waste was collected, and was fully dried and broken up to 0.05-3 mm to obtain a dried sample.

2) The dried sample obtained in step (1) was diluted with pure water in a container to obtain a mixture with a solid content less than 5%, and the mixture was fully stirred by an external magnetic stirrer having a magnetic stirring bar. The container and the magnetic stirring bar were cleaned and dried before use.

3) The mixture obtained in step (2) was analyzed using a laser particle size analyzer, so as to measure a wave vector Q and a scattering intensity I of the mixture. A light source of the laser particle size analyzer was a helium-neon laser emitting at 633 nm. A refractive index of a dispersant was 1.330. An absorption rate of particles in the dispersant was 0.100. A density of the dispersant was greater than 1. The dispersant was water. Time for a background measurement was 10 s. Time for measuring the mixture was 10-12 s. Time for measuring the mixture with uneven dispersion was 10-20 s. Each mixture was measured 3 times. During a measurement, a shading range of a mixture containing particles having a diameter of tens of microns was 10-20%; a shading range of a mixture containing particles having a diameter of a few microns was 6-10%; a shading range of a mixture containing particles have a diameter of hundreds of nanometers was 4-6%; and a shading range of a mixture with uneven dispersion was 10-20%. A stirring speed was 2000-3000 r/min. After each mixture was measured, a cleaning system of the laser particle size analyzer is operated before the following measurement.

4) Based on fractal theory, the wave vector Q and the scattering light intensity I obtained in step (3) were analyzed using a data processing software. According to the formula $I \propto Q^{-D_f}$, an equation $I = k \cdot Q^{-D_f}$ was obtained, where k was a slope. Both sides of the equation took the natural logarithm to obtain: $\ln I = \ln(k \cdot Q^{-D_f})$, and then the equation was simplified as: $\ln I = -D_f \ln Q + \ln k$. The I and Q obtained in step (3) took the natural logarithm to obtain ln I and ln Q which were taken as a dependent variable and an independent variable, respectively, and the fractal dimension $D_f$ of the sample was obtained using linear fitting.

5) According to data from documents and experiments, the fractal dimensions $D_f$ of different kinds of straws, and corresponding $TOC_{max}$ and AAE were obtained, and then were input into a data processing software to carry out the linear fitting to establish a model:

$$Y=A-BX,$$

where X was the fractal dimension $D_f$; Y was $TOC_{max}$ or AAE of the sample; and A and B were coefficients of the model corresponding to the $TOC_{max}$ or the AAE.

6) The fractal dimension $D_f$ of each kind of straw was plugged into the model established in step (5), and the $TOC_{max}$ and the AAE thereof were calculated.

Specifically, the organic solid waste includes but is not limited to straws. Further, the straws can be rice straws.

The AAE can be calculated by a deformation of Arrhenius equation:

$$k_{dissolution} = A_0 \cdot e^{-\frac{AAE}{RT}}$$

where $k_{dissolution}$ is a rate constant of dissolution of organic matter, $min^{-1}$; $A_0$ is a pre-exponential factor; R is a molar gas constant, J/mol·K; T is a thermodynamic temperature, K; and AAE is an apparent activated energy of dissolution of organic matter, kJ/mol.

The particle diameters of the broken rice straws, corresponding predicted $D_f$, $TOC_{max}$ and AAE are shown in Table 1.

TABLE 1

| Size (mm) | $D_f$ | $TOC_{max}$ | AAE |
| --- | --- | --- | --- |
| 3 | 1.8712 | 475.6 | 31.1572 |
| 1 | 1.8151 | 590.4 | 27.3970 |
| 0.9 | 1.7282 | 600.7 | 27.1265 |
| 0.7 | 1.7042 | 637.9 | 26.8463 |
| 0.6 | 1.6968 | 654.1 | 26.6742 |
| 0.5 | 1.6928 | 710.6 | 26.5651 |
| 0.2 | 1.6805 | 921.6 | 26.1108 |
| 0.1 | 1.6792 | 958.4 | 25.7248 |
| 0.05 | 1.6538 | 972.4 | 25.5362 |

FIG. 1 shows fitting curves for evaluating pretreatment effects for rice straws with different sizes based on fractal dimension.

Embodiment 2

A method for evaluating a pretreatment effect for organic solid waste based on fractal dimension includes the following steps.

1) A sample of organic solid waste was collected, and was fully dried and broken up to 2.8 mm to obtain a dried sample.

2) The dried sample obtained in step (1) was diluted with pure water in a container to obtain a mixture with a solid content less than 5%, and the mixture was fully stirred by an external magnetic stirrer having a magnetic stirring bar. The container and the magnetic stirring bar were cleaned and dried before use.

3) The mixture obtained in step (2) was analyzed using a laser particle size analyzer, so as to measure a wave vector Q and a scattering intensity I of the mixture.

A light source of the laser particle size analyzer was a helium-neon laser emitting at 633 nm. A refractive index of a dispersant was 1.330. An absorption rate of particles in the dispersant was 0.100. A density of the dispersant was greater than 1. The dispersant was water. Time for a background measurement was 10 s. Time for measuring the mixture was 10-12 s. Time for measuring the mixture with uneven dispersion was 10-20 s. Each mixture was measured 3 times. During a measurement, a shading range of a mixture containing particles having a diameter of tens of microns was 10-20%; a shading range of a mixture containing particles having a diameter of a few microns was 6-10%; a shading range of a mixture containing particles have a diameter of hundreds of nanometers was 4-6%; and a shading range of a mixture with uneven dispersion was 10-20%. A stirring speed was 2000-3000 r/min. After each mixture was measured, a cleaning system of the laser particle size analyzer is operated before the following measurement.

4) Based on fractal theory, the wave vector Q and the scattering light intensity I obtained in step (3) were analyzed using a data processing software. According to the formula $I \propto Q^{-D_f}$, an equation $I = k \cdot Q^{-D_f}$ was obtained, where k was a slope. Both sides of the equation took the natural logarithm to obtain: $\ln I = \ln(k \cdot Q^{-D_f})$, and then the equation was simplified as: $\ln I = -D_f \ln Q + \ln k$. The I and the Q obtained in step (3) took the natural logarithm to obtain ln I and ln Q which were taken as a dependent variable and an independent variable, respectively, and the ln I and the ln Q are inputted into the data processing software to determine the fractal dimension $D_f$ of the sample using stochastic gradient descent.

5) According to data from documents and experiments, the $D_f$ of different kinds of straws, and corresponding $TOC_{max}$ and AAE were obtained, and then were inputted into the data processing software to carry out the linear fitting to establish a model:

$$Y=A-BX,$$

where X was the $D_f$ of the sample; Y was $TOC_{max}$ or AAE of the sample; and A and B were coefficients of the model corresponding to the $TOC_{max}$ or the AAE.

6) The fractal dimension $D_f$ of each kind of straw was plugged into the model established in step (5), and the $TOC_{max}$ and the AAE thereof were outputted by the model.

Specifically, the organic solid waste includes but is not limited to straws. Further, the straws may be rice straws.

The AAE can be calculated by a deformation of Arrhenius equation:

$$k_{dissolution} = A_0 \cdot e^{-\frac{AAE}{RT}},$$

where $k_{dissolution}$ is a rate constant of dissolution of organic matter, $min^{-1}$; $A_0$ is a pre-exponential factor; R is a molar gas constant, J/mol·K; T is a thermodynamic temperature, K; and AAE is an apparent activated energy of dissolution of organic matter, kJ/mol.

The pretreatments in this embodiment are shown in Table 2. The pretreatments of the organic solid waste and corresponding predicted $D_f$, $TOC_{max}$ and AAE are shown in Table 2.

TABLE 2

| Method | $D_f$ | Evaluated $TOC_{max}$ | Evaluated AAE |
|---|---|---|---|
| No pretreatment | 1.9375 | 299.3063 | 31.5557 |
| Hydrothermal pretreatment | 1.8908 | 392.6362 | 30.55968 |
| Hydrothermal pretreatment + potassium hydroxide | 1.8016 | 570.9024 | 28.65722 |
| Hydrothermal pretreatment + potassium hydroxide + sodium sulfite | 1.7406 | 692.8109 | 27.35622 |
| Hydrothermal pretreatment + sodium sulfite | 1.8065 | 561.1098 | 28.76173 |
| Hydrothermal pretreatment + acetic acid | 1.8253 | 523.538 | 29.1627 |
| Hydrothermal pretreatment + formaldehyde | 1.8194 | 535.3291 | 29.03686 |
| Hydrothermal pretreatment + hydrochloric acid | 1.7488 | 676.4232 | 27.53111 |
| Hydrothermal pretreatment + ferrous chloride | 1.7831 | 607.8747 | 28.26266 |
| Hydrothermal pretreatment + tetrahydrofuran | 1.7839 | 606.2759 | 28.27972 |

Figure 2:
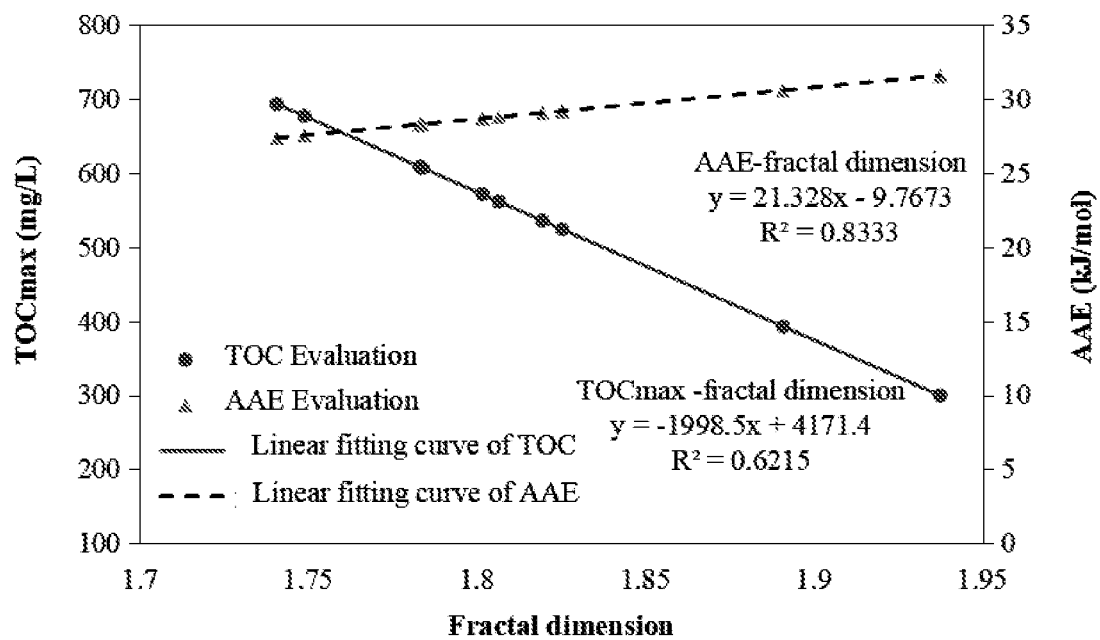
FIG. 2 shows fitting curves for evaluating pretreatment effects of rice straws pretreated by different methods according to an embodiment of the present disclosure.

FIG. 2 shows fining curves for evaluating pretreatment effects of rice straws pretreated by different methods.

The above are only preferred embodiments of this application, and are not intended to limit the scope of this application. Any modification, equivalent replacement and improvement made by those skilled in the art within the spirit and principle of this application shall fall within the protection scope of this application.

What is claimed is:

1. A method for evaluating a pretreatment effect for organic solid waste based on fractal dimension, comprising:
   1) collecting samples of the organic solid waste, and drying and breaking up the samples to obtain dried samples;
   2) adding water into the dried samples obtained in step (1) followed by stirring to obtain mixtures, respectively;
   3) analyzing the mixtures obtained in step (2) using a laser particle size analyzer, so as to measure a wave vector Q and a scattering intensity I of each of the mixtures;
   4) according to a fractal theory, analyzing the wave vector Q and the scattering intensity I obtained in step (3) using a data processing software; and obtaining a two-dimensional fractal dimension $D_f$ of each of the samples according to a formula $I \propto Q^{-D_f}$;
   5) constructing a calculation model of the $D_f$ and a total organic carbon ($TOC_{max}$) or an apparent activated energy (AAE) using linear regression; and
   6) plugging the $D_f$ of each of the samples into the calculation model obtained in step (5) to obtain the $TOC_{max}$ or the AAE of each of the samples, so as to evaluate the pretreatment effects for samples of the organic solid waste;

wherein in step (4), the formula $I \propto Q^{-D_f}$ is an equation $I = k \cdot Q^{-D_f}$, wherein k is a slope; both sides of the equation take natural logarithm to obtain: $\ln I = \ln(k \cdot Q^{-D_f})$; then the equation is simplified as: $\ln I = -D_f \ln Q + \ln k$; the I and the Q obtained in step (3) take the natural logarithm to obtain $\ln I$ and $\ln Q$ which are taken as a dependent variable and an independent variable of the equation, respectively, and the $\ln I$ and the $\ln Q$ are inputted into the data processing software to determine the $D_f$ of each of the samples using stochastic gradient descent;

in step 5, the calculation model of the $D_f$ and the $TOC_{max}$ or AAE of each of the samples is:

$Y = A - BX;$ wherein X is the fractal dimension $D_f$, Y is the $TOC_{max}$ or the AAE of each of the samples; A and B are coefficients of the calculation model of the $TOC_{max}$ or AAE; and in step 6, the $TOC_{max}$ is a maximum dissolution value of total organic carbon of each of the samples in an aqueous phase.

2. The method of claim 1, wherein in step 1, the samples are samples which are pretreated.

3. The method of claim 2, wherein in step 1, the samples are samples with different sizes or samples pretreated by different methods.

4. The method of claim 3, wherein the samples are broken up as particle sizes ranging from 0.01 to 3500 microns.

5. The method of claim 1, wherein in step 2, each of the dried samples is diluted with pure water in a container to obtain a mixture with a solid content of less than 5%; the mixture is stirred by an external magnetic stirrer having a magnetic stirring bar; and the container and the magnetic stirring bar are cleaned and dried before use.

6. The method of claim 1, wherein in step (3), a light source of the laser particle size analyzer is a helium-neon laser emitting at 633 nm; a refractive index of a dispersant is 1.330; an absorption rate of particles in the dispersant is 0.100; a density of the dispersant is greater than 1; the dispersant is water; time for a background measurement is 10 s; time for measuring the mixture is 10-12 s; time for measuring the mixture with uneven dispersion is 10-20 s; the mixture is measured 3 times; during a measurement, a shading range of the mixture containing particles having a diameter of tens of microns is 10-20%; a shading range of the mixture containing particles having a diameter of a few microns is 6-10%; a shading range of the mixture containing particles have a diameter of hundreds of nanometers is 4-6%; a stirring speed is 2000-3000 r/min; and after the mixture is measured, a cleaning system of the laser particle size analyzer is operated.

7. The method of claim 6, wherein the time for measuring the mixture with uneven disperse is set to 10-20 s, and the shading range thereof is 10-20%.

* * * * *